June 2, 1964 J. W. DODSWORTH 3,135,475

TAPE TRANSPORT MEANS

Filed Nov. 22, 1961

3 Sheets-Sheet 1

INVENTOR.
JAMES W. DODSWORTH

BY George V. Hall

ATTORNEY

June 2, 1964 J. W. DODSWORTH 3,135,475

TAPE TRANSPORT MEANS

Filed Nov. 22, 1961

3 Sheets-Sheet 2

INVENTOR.
JAMES W. DODSWORTH
BY George V. Hall
ATTORNEY

June 2, 1964 J. W. DODSWORTH 3,135,475

TAPE TRANSPORT MEANS

Filed Nov. 22, 1961 3 Sheets-Sheet 3

INVENTOR.
JAMES W. DODSWORTH

BY George V. Hall

ATTORNEY

United States Patent Office 3,135,475
Patented June 2, 1964

3,135,475

TAPE TRANSPORT MEANS

James W. Dodsworth, Mount Tabor, N.J., assignor to Monroe Calculating Machine Company, Orange, N.J., a corporation of Delaware Filed Nov. 22, 1961, Ser. No. 154,198
6 Claims. (Cl. 242—55.11)

This invention relates to record tape transport means for data processing apparatus, and more particularly to means in such apparatus for mounting a tape supply reel and a tape take-up reel, and for driving the take-up reel.

In data processing apparatus including a tape supply reel and a tape take-up reel, the tape is fed from the supply reel through the processing apparatus onto the take-up reel. Usually the reels are located in the same plane and are rotatably mounted on individual shafts. In this arrangement the parts extend over a considerable area, and therefore the arrangement may not be practical where compactness is desirable.

In data processing apparatus of the above type, it is obviously advantageous to provide for processing of different width tapes. If the apparatus is adapted for such operation, then the tape transport must be adapted for operation with correspondingly different width reels to accommodate the tapes. It is therefore usual to provide a plurality of sets of different width reels for the apparatus.

It is the primary object of the invention to provide an improved and compact tape transport.

A more specific object is to achieve compactness of structure in a tape transport by supporting the supply reel and the take-up reel on a common shaft.

A further object is to provide a tape transport wherein parts assembled to form a supply reel and a take-up reel to accommodate a given width tape may be reassembled to accommodate another given width tape.

Another object is to provide an improved drive for the take-up reel of a tape transport wherein the supply reel is supported on a common shaft with the take-up reel.

Other objects and advantages of the invention will be evident from the following description with reference to the accompanying drawings in which.

Figure 1:
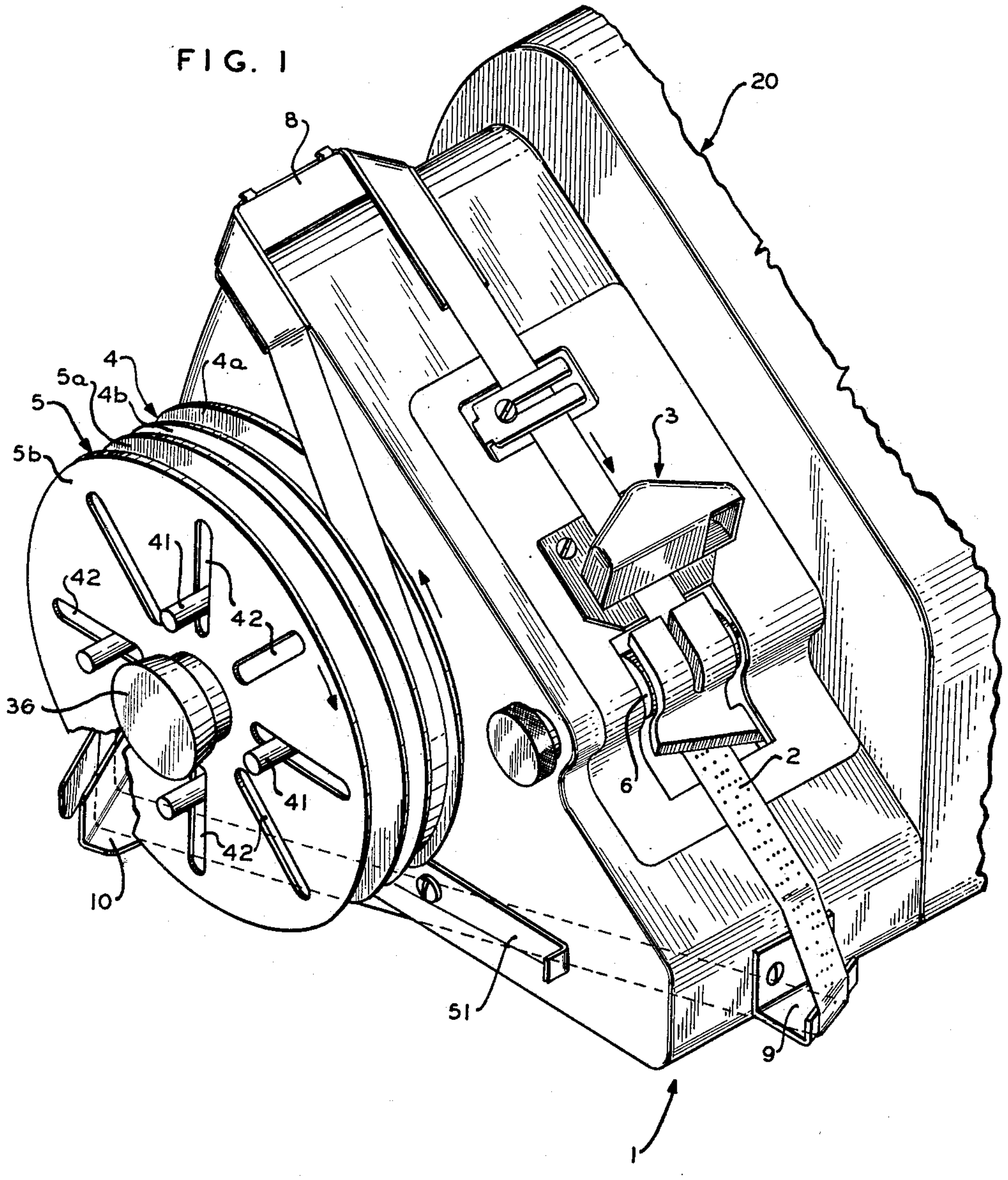
FIG. 1 is a perspective view of the tape transport including a supply reel and a take-up reel mounted on a side wall of a tape punch.

The tape transport is disclosed as operating in conjunction with a tape punch 1 (FIG. 1). The punch is of the type disclosed in application S.N. 561,759, now Patent No. 3,018,040, wherein a tape 2 is fed by a sprocket wheel 6 through a punching station 3 where coded data is punched in the tape by punch members (not shown).

The tape punch is mounted on the left side frame of an accounting machine 20 (FIG. 1). As fully disclosed in said application No. 561,759, readout means is operable to control tape punch 1 to punch tape 2 in accordance with data entered into the accounting machine.

Figures 2, 3, 4:
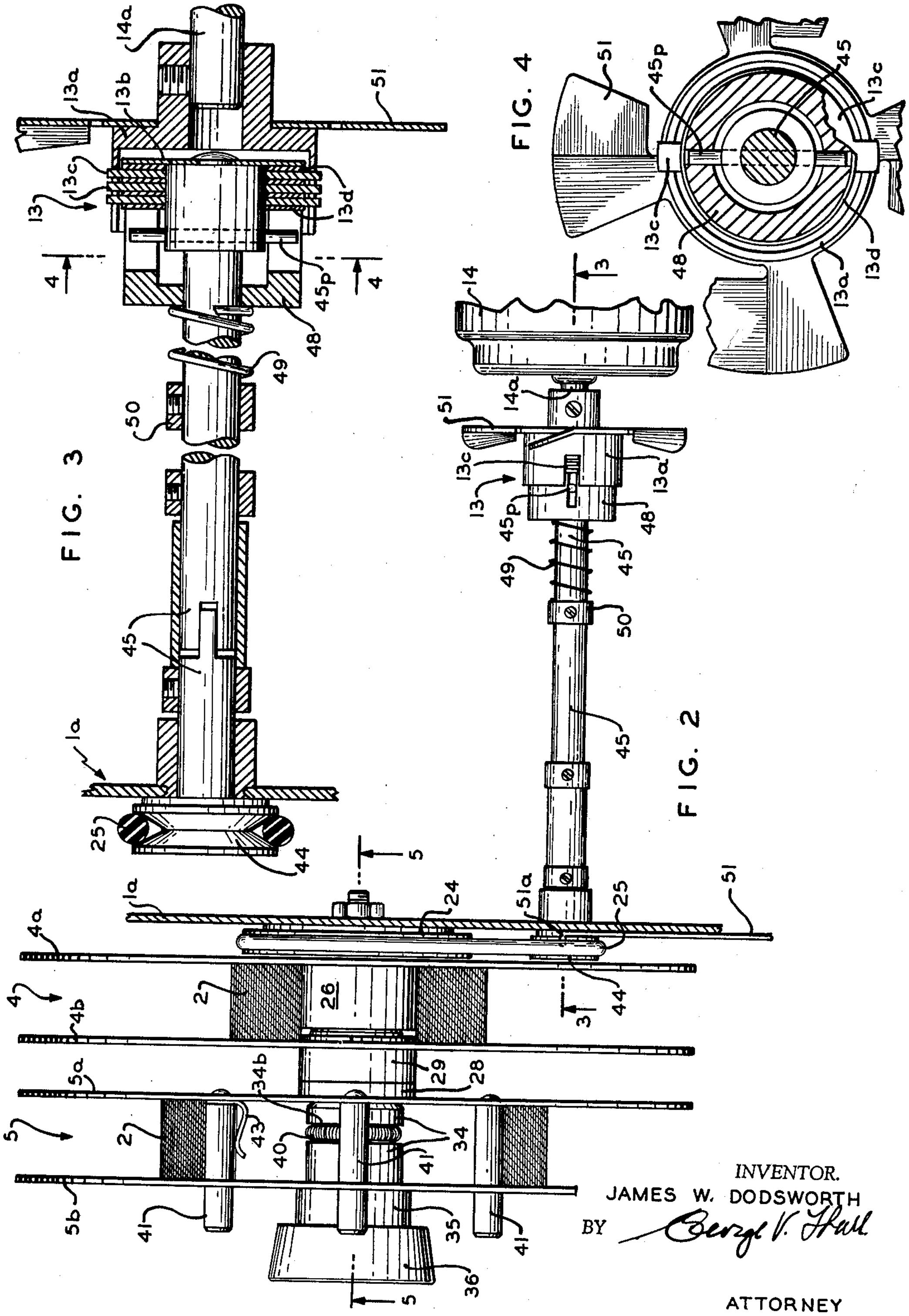
FIG. 2 is a plan view of the reels and the drive means for the take-up reel.
FIG. 3 is a sectional view of the drive means taken on line 3—3 of FIG. 2.
FIG. 4 is a detailed section of the drive means taken on line 4—4 of FIG. 3.

The tape transport means of the present invention includes a supply reel 4 and a take-up reel 5 mounted on a common axis on the left side frame of the tape punch housing; the supply reel being mounted for free rotation and the take-up reel being mounted for rotation by a slip clutch 13 (FIGS. 2, 3) which is driven by the motor 14 of the accounting machine as later described.

Although the tape transport is disclosed as operating in conjunction with a tape punch and an accounting machine, it will be understood that the transport is not limited to such use but is intended for use with any apparatus wherein a tape is fed from a supply reel through the apparatus and onto a take-up reel.

As the tape is fed forwardly through punch station 3 (FIG. 1) by sprocket wheel 6, it is pulled from supply reel 4 which is thereupon rotated counterclockwise as indicated. A guide plate 8 located at the rear of the punch housing is bent to direct the tape rearwardly from the supply reel and then forwardly toward the punch station.

After the tape is fed forwardly from drive sprocket 6, is passes over a guide plate 9 located at the lower front of the punch housing. Guide plate 9 is bent to direct the tape rearwardly and outwardly of the punch where it passes upwardly over a guide plate 10 and in clockwise direction around take-up reel 5.

Take-up reel 5 is continuously urged clockwise by slip clutch 13 (FIGS. 2, 3) during operation of the punch and will therefore wind the tape as it is fed beyond sprocket wheel 6. The driving member (later described) of clutch 13 is driven by motor 14 at a speed greater than required to wind the tape as it is fed from the punch regardless of the size of the tape roll. The clutch therefore will slip continuously and as a result, the tape will always be wound as fast as it is fed from the punch.

Figure 5:
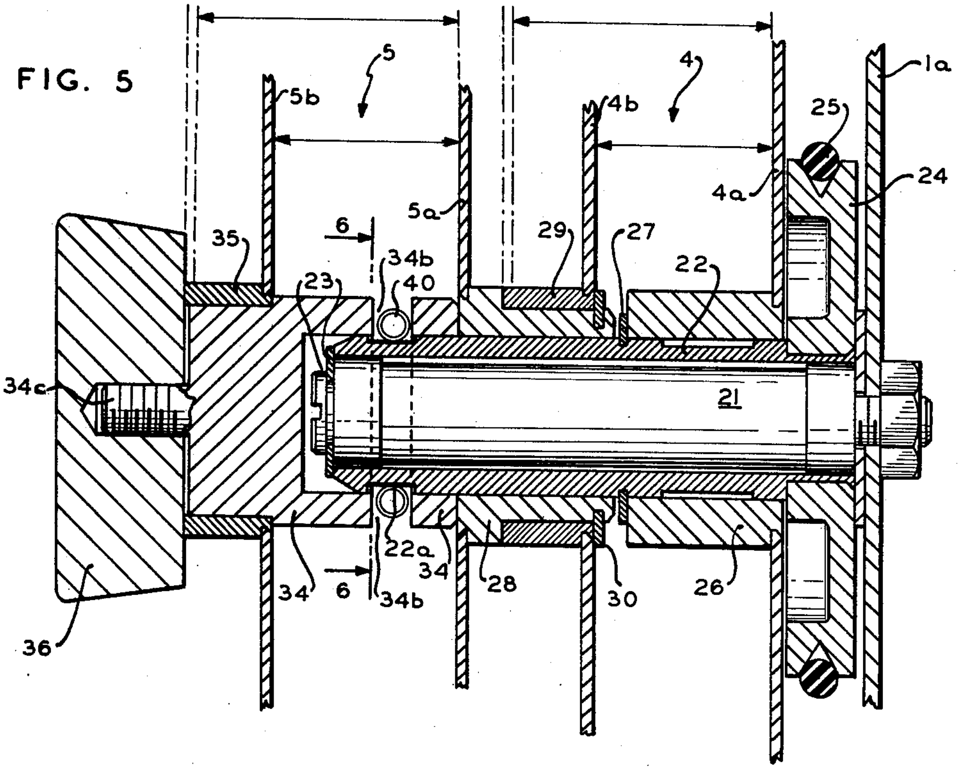
FIG. 5 is an enlarged, detailed section of the reels taken on line 5—5 of FIG. 2.

The supply and take-up reels 4, 5 are supported on a common stud shaft 21 (FIG. 5) which is bolted at its right end to the left side frame 1*a* of punch 1 and extends outwardly therefrom. A sleeve 22 extends the length of shaft 21 and is rotatably mounted thereon. Suitable bolt and washer means 23 at the left free end of shaft 21 restrains sleeve 22 from axial movement on shaft 21.

A pulley 24 (FIGS. 2, 5, 7) is securely staked on the right end of sleeve 22 immediately outwardly of the side frame 1*a* of punch 1. Pulley 24 is driven by a belt 25 as later described and accordingly will rotate sleeve 22 on shaft 21.

The right flange 4*a* of supply reel 4 is staked on the right end of a hub 26 which is freely mounted for rotation on sleeve 22 with the flange immediately adjacent pulley 24. An arcuate washer 27 engages a peripheral slot in sleeve 22 adjacent the left end of hub 26. Thus flange 4*a* and hub 26 are restrained from axial movement by pulley 24 and washer 27.

Another hub 28 is freely mounted on sleeve 22 with its right end adjacent washer 27. A substantially short left end portion of hub 28 is of the same diameter as hub 26. However, the longer right portion adjacent hub 26 is of a reduced diameter.

A sleeve-like outer hub 29 is freely mounted for rotation on the reduced portion of inner hub 28. The outer hub is of the same diameter as the larger left end portion of inner hub 28 and extends from said larger portion to a distance short of the right end of the reduced portion.

The left flange 4*b* of supply reel 4 is staked on the right end of hub 29 and the parts are restrained from axial movement on hub 28 by the shoulder at the left end of the reduced portion of the hub and by an arcuate washer 30 which engages a peripheral slot adjacent the right end of the hub.

The right flange 5*a* of take-up reel 5 is staked on the left end of hub 28 which is abutted by the right open end of a cup shaped hub member 34 slidably mounted over the left end of sleeve 22 and retained thereon as later described. A sleeve 35 is slidably mounted over the left closed end of hub member 34, and the left flange 5b of take-up reel 5 is staked on the right end of the sleeve.

A threaded stud 34c extends from the left closed end of hub member 34 and a knob 36 threaded on the stud engages the left end of sleeve 35 which projects a slight distance beyond hub member 34. The right end of sleeve 35 engages a shoulder of hub member 34. Thus the two parts 34, 35 are securely clamped together to form a hub for flange 5b.

The drive for take-up reel 5 is transmitted from sleeve 22 to hub member 34 by a flexible band formed of a coiled spring 40. Spring 40 is retained in a pair of opposed arcuate recesses 34a (FIG. 6) of hub member 34 and passes through the hub wall by way of a pair of opposed arcuate openings 34b disposed at right angles to recesses 34a.

A ring of slightly recessed straight knurling 22a encircles sleeve 22 adjacent its left end which is tapered so that hub 34 may be readily slid over the end to bring openings 34b into registration with knurling 22a and spring 40 into engagement with knurling 22a. Hub 34 therefore will be retained on sleeve 22 by engagement of spring 40 with the recessed knurling, and accordingly hub 28 trapped between hub 34 and washer 27 will also be retained on the sleeve.

Figures 6, 7:
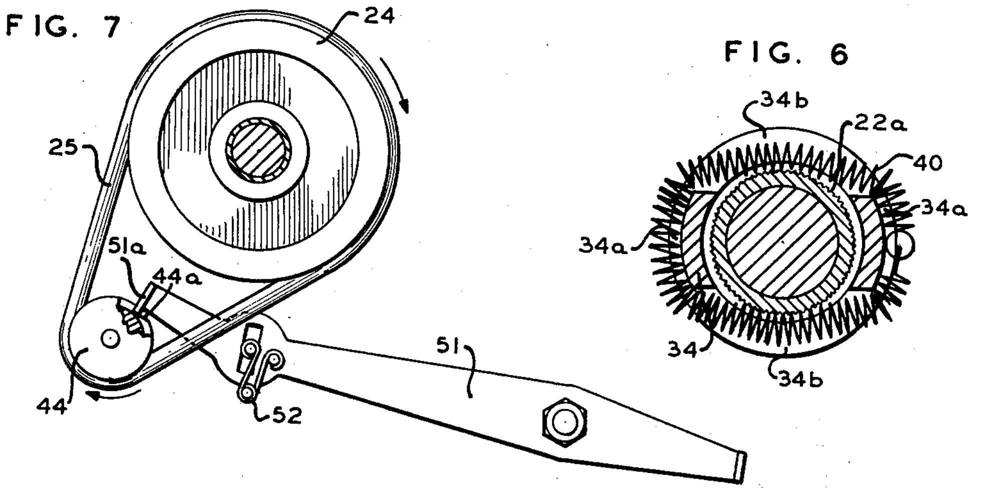
FIG. 6 is a sectional detail of the drive means taken on line 6—6 of FIG. 5.
FIG. 7 is a detailed elevation of a control means for the drive means.

Knurling 22a engages a plurality of coils of spring 40, as clearly seen in FIG. 6, and the spring is bent at sharp angles where it engages the outer end edges of openings 34b of the hub. This precludes the possibility of slippage between sleeve 22, spring 40 and hub member 34, and therefore positive drive is transmitted from the sleeve to the hub to which flange 5b is secured.

Coupling means provides for rotation of flange 5a with flange 5b. The coupling means comprises pins 41 (FIGS. 1, 2) which project toward the left from flange 5a and engage radially disposed slots 42 in flange 5b. Pins 41 engage alternate slots 42 and thus less angular adjustment is necessary in bringing the slots into position to engage the pins when assembling the parts.

The parts are most easily disassembled for removal of a roll of tape from take-up reel 5 and for the placement of a supply roll of tape over hub 26 of supply reel 4. First hub 34, 35 which carries flange 5b is pulled from the end of sleeve 22 by knob 36 for removal of a take-up roll. In this operation, straight knurling 22a which runs longitudinally of sleeve 22 permits easy disengagement of drive transmission spring 40. Next hub 28 which carries flange 5a, hub 29 and flange 4b is slid from sleeve 22. Accordingly, a supply reel may be placed over hub 26 which carries flange 4a and the parts reassembled. The tape is then run from the supply reel through the punch and onto the take-up reel as shown in FIG. 1. One of the pins 41 of take-up reel 5 is provided with a clip 43 (FIG. 2) for attachment of the leading end of the tape which will be wound around the outsides of the pins as the reel is driven.

When the transport parts are disassembled, they may be reassembled for a different width tape. This is accomplished by removal of arcuate washer 30 and reversal of hub 29 on hub 28. Then knob 36 is removed and sleeve 35 is reversed on hub 34. As a result, when the parts are reassembled, flanges 4b and 5b will be located farther to the left with respect to flanges 4a and 4b in the dot-dash positions of FIG. 5 to provide for a wider tape.

Flanges 4a, 4b of supply reel 4 are mounted on separate hubs 26, 29. The respective hubs, however, are freely rotatable on sleeve 22 and hub 28 and will therefore rotate in unison by friction of the tape as it is pulled from the reel. Likewise flanges 5a, 5b of take-up reel 5 are mounted on separate hubs 28 and 34, 35. Flanges 5a, 5b, however, are coupled by pins 41 and therefore the parts will be positively driven with sleeve 22 by transmission spring 40.

Sleeve 22, as noted, has a pulley 24 staked on its right end and the pulley is driven by a belt 25. Belt 25 is driven by a pulley 44 (FIGS. 2, 3, 7) fixed on the left end of a sectional shaft 45 journalled in the framing of the tape punch and which is driven by slip clutch 13.

Clutch 13 includes a cup-shaped driving member 13a fast on shaft 14a of motor 14. The driven member of the clutch includes a disc 13b located within member 13a and fast on the right enlarged end of shaft 45. A plurality of apertured driving discs 13c encircle the enlarged end of shaft 45 and have opposed ears engaging respectively a pair of opposed longitudinal slots in the sides of driving member 13a. Discs 13c therefore are rotatably driven with member 13a and are axially adjustable with respect to shaft 45. Apertured friction discs 13d are located at either side and between driving discs 13c.

A cup-shaped pressure member 48 is slidably mounted on shaft 45 with its open end engaging the leftmost friction disc 13d. A pin 45p extending through the enlarged end of shaft 45 has its ends engaging opposed longitudinal slots in the sides of pressure member 48. Member 48 therefore is rotatably connected to shaft 45 and is longitudinally adjustable thereon.

A compression spring 49 is trapped between a collar 50 fixed on shaft 45 and pressure member 48. Member 48 therefore will be urged against the stack of discs 13c, 13d which in turn will be urged against driven disc 13b. Thus torque will be transmitted from driving member 13a to shaft 45 via discs 13c, 13d, 13b and member 48.

It has been noted that during operation, clutch 13 will be continuously slipping and to avoid undue heat build up, due to friction, a fan 51 is attached for rotation with driving member 13a to insure dissipation of the heat.

It will be necessary in many instances to operate the accounting machine without attendant operation of the tape punch. In such instances, it will be desirable to disable the drive from motor 14 of the accounting machine to takeup reel 5. Such disabling means comprises a manually settable lever 51 (FIGS. 1, 7) mounted on the left side frame of punch 1 and held in clockwise and counterclockwise adjusted positions by a toggle spring 52.

When lever 51 is adjusted to the counterclockwise position of FIG. 7, a toe 51a at its left end engages a notch 44a in the rim of pulley 44 thereby arresting operation of the drive to take-up reel 5. Slip-clutch 13 will then permit operation of the accounting machine while take-up reel 5 is arrested from rotation. Upon clockwise adjustment of lever 51, pulley 44 will be released and motor 14 will be effective to drive the take-up reel. Of course, if an independent drive is used for the take-up reel, the above means for disabling the drive to the reel will be eliminated.

Although there is disclosed herein a preferred embodiment of the invention, it will be understood that various modifications may be made in the structure without departing from the scope and spirit of the appended claims.

I claim:

1. In a tape transport:

a supply reel and a take-up reel each including a pair of flanges, a supporting shaft for said reels having a secured inner end and an outward free end, a sleeve rotatably mounted on said shaft, means for driving said sleeve, a hub for one flange of said supply reel rotatably mounted in an innermost position on said sleeve, a hub for one flange of said take-up reel rotatably mounted in an intermediate position on said sleeve and slidably removable therefrom, a hub for the other flange of said supply reel rotatably mounted on said hub for said one flange of said take-up reel, a hub for the other flange of said take-up reel mounted in an outermost position on said sleeve and slidably removable therefrom, means operable by said sleeve for driving said hub of said other flange of said take-up reel, and
means operable upon rotation of said other flange of said take-up reel to rotate said one flange of said take-up reel.

2. The invention according to claim 1 wherein:
said hub for said other flange of said supply reel may be removed and reversely assembled on said hub of said one flange of said take-up reel, and
said hub for said other flange of said take-up reel comprises a body portion and a sleeve portion secured on said body portion and to which said other flange is attached, said sleeve portion being removable for reverse assembly on said body portion.

3. In a tape transport:
a pair of reels each including a pair of flanges,
a supporting shaft for said reels,
individual hub means for each of said flanges,
means for rotatably supporting each of said hub means and its flange as an individual unit on said shaft including means alternatively operable to locate said hub means of one flange of each reel in a first or in a second position on said supporting means to locate said one flange at a first or at a second distance from the other flange of said reel, and
means for driving in unison the hub means of a pair of flanges of one of said reels.

4. The invention according to claim 3 wherein:
said one flange is located nearer to one end than to the other end of its hub means; and
said one end of said hub means faces toward the other flange of said reel when said hub means is in said first position and faces away from said other flange when said hub means is in said second position.

5. In a tape transport:
a supply reel and a take-up reel each including a pair of flanges,
a supporting shaft for said reels,
individual hub means for each of said flanges,
means for rotatably supporting said hub means on said said shaft including a sleeve rotatably mounted on said shaft,
means for driving said sleeve,
means operable by said sleeve for driving the hub means of one of the flanges of said take-up reel comprising a ring of knurling on said sleeve, and a band formed of a coil spring engaging said knurling and said hub means, and
means operable upon rotation of said one flange of said take-up reel to rotate the other flange of said take-up reel.

6. In a tape transport:
a supply reel and a take-up reel each including a pair of flanges,
a supporting shaft for said reels,
supporting means including a supporting sleeve rotatably mounted on said shaft,
individual hub means for each of said flanges rotatably supported on said supporting means, the hub means of one flange of each reel comprising a hub sleeve adjacent one end of which said one flange is mounted, said hub sleeve being alternatively mountable on said supporting means with said one end facing toward the other flange of said reel or with said one end facing away from said other flange,
means for driving said supporting sleeve,
means operable by said supporting sleeve to drive the hub means of one of the flanges of said take-up reel, and
means operable upon rotation of said one flange of said take-up reel to rotate the other flange of said take-up reel.

References Cited in the file of this patent

UNITED STATES PATENTS

| | | |
|---|---|---|
| 1,877,440 | Adatte | Sept. 13, 1932 |
| 1,965,884 | Crosman | July 10, 1934 |
| 2,147,776 | Mitchell | Feb. 21, 1939 |
| 2,172,754 | Lasker | Sept. 12, 1939 |
| 2,229,905 | Sundstrand | Jan. 28, 1941 |
| 2,349,018 | Tasker | May 16, 1944 |
| 2,381,535 | Gemmel | Aug. 7, 1945 |
| 2,531,913 | Kaim | Nov. 28, 1950 |
| 2,732,144 | Jones | Jan. 24, 1956 |
| 2,869,799 | Hunter | Jan. 20, 1959 |
| 2,873,073 | Lekas | Feb. 10, 1959 |
| 3,025,016 | De Boo | Mar. 13, 1962 |